Dec. 4, 1923.
P. TAWNEY
1,476,657
PISTON RING
Filed May 11, 1921
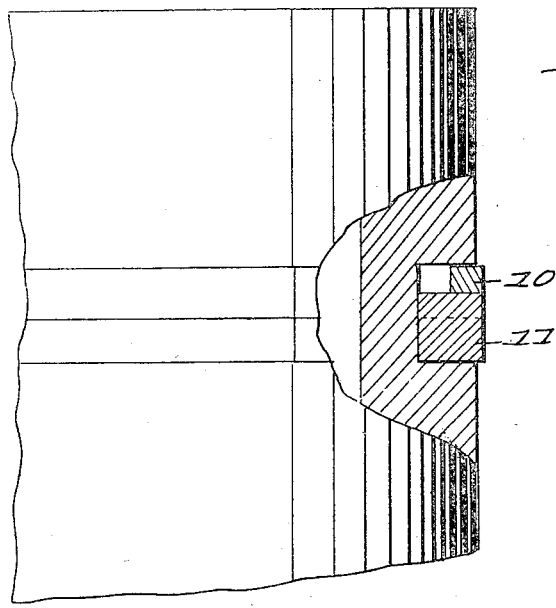
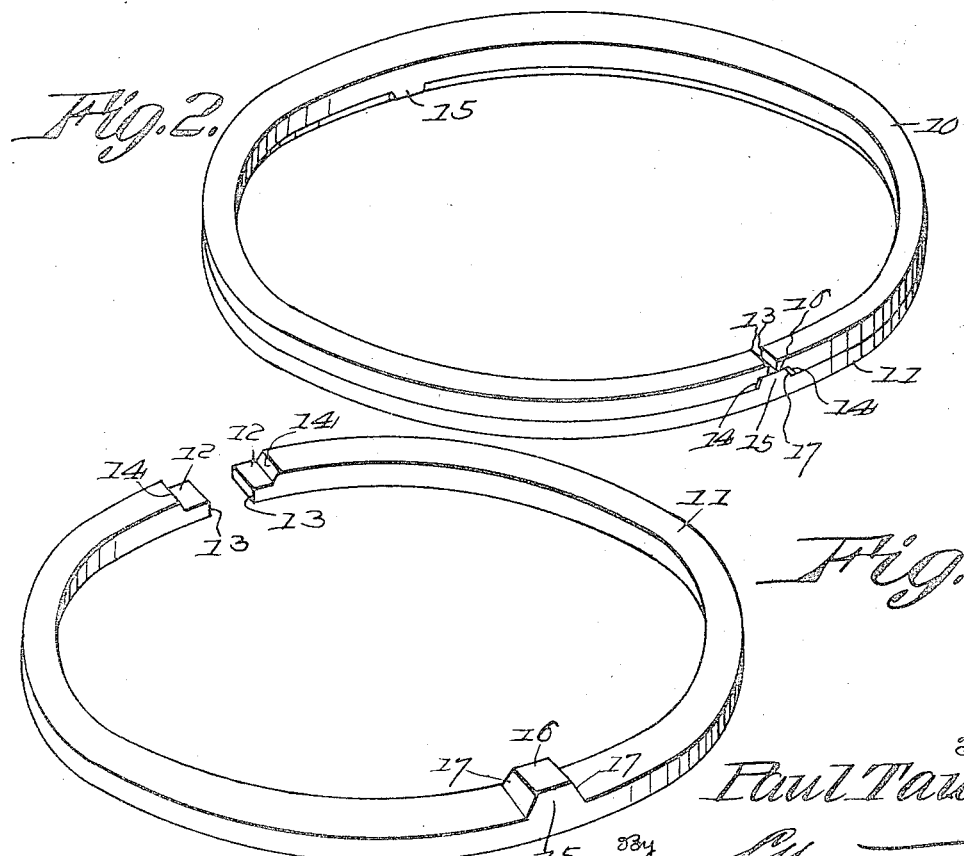
Inventor
Paul Tawney,
By
Attorney Patented Dec. 4, 1923.

1,476,657

UNITED STATES PATENT OFFICE.

PAUL TAWNEY, OF MUSKEGON, MICHIGAN.

PISTON RING.

Application filed May 11, 1921. Serial No. 468,625.

*To all whom it may concern:*

Be it known that I, PAUL TAWNEY, a citizen of the United States of America, residing at Muskegon, in the county of Muskegon and State of Michigan, have invented new and useful Improvements in Piston Rings, of which the following is a specification.

The object of the invention is to provide a simple and efficient construction of piston packing ring designed for use in connection with cylinder pistons and particularly adapted to provide against leakage of pressure and the pumping of oil, particularly in connection with explosion or internal combustion engines through the joints between the terminals of the split or expansion rings of the step lap or bevel lap joint type; and with these objects in view the invention consists in a construction and combination of parts of which a preferred embodiment is shown in the accompanying drawings, wherein:

Figure 1 is a view of a piston ring embodying the invention applied in the operative position to a cylinder piston of which the latter is partly broken away to show the ring in section.

Figure 2 is a view of the ring detached from the piston with the members thereof in their operative relation.

Figure 3 is a similar view of one of the ring members.

The improved ring consists of complemental twin members 10 and 11, each of which is of the split ring form with the terminals thereof provided with longitudinal sliding faces 12 and abutting or transverse faces 13 and 14 respectively formed at the extremities and as shoulders set back from the extremities of the member, said terminals being adapted for cooperation with a lateral projection 15 formed on the ring member at a point diametrically opposite the split and having the sliding face 16 and the abutting face 17, so that when the two complemental ring members are arranged in cooperative relation the terminals of one ring are disposed in operative relation with the projection of the complemental ring as shown in Figures 1 and 2 with the sliding faces 12 of the terminals arranged in overlapping relation with the sliding face 16 of the projection and with the projection occupying a position between the abutting faces 14 of the terminals to prevent relative rotary movement of the ring members beyond a definite prescribed limit, so that opposite the lap joint of each ring member there is always located a solid unbroken portion of the complemental ring member to provide against any joint through which compression may be lost or oil fed by suction or pumping action of the piston.

Each ring member is free to expand for the purpose of compensating for wear of the ring or the cylinder or both as in the ordinary practice and yet regardless of the extent to which the joint of each ring member may be opened, there is positive provision against an opening extending from one side surface of the composite ring to the other and hence an absolute provision against leakage.

Having described the invention, what is claimed as new and useful is:—

1. A piston packing ring consisting of complemental twin members each of which is of split ring form with the terminals thereof provided with longitudinal sliding faces disposed in parallelism with the face of the ring, each member being formed with transverse faces disposed obliquely to the face of the ring and set back from the extremities of the member, each member being provided diametrically opposite the split with a lateral projection having a sliding face paralleling the face of the ring and transverse abutting faces obliquely disposed with reference to the face of the ring, the longitudinal sliding faces and transverse faces of each member slidably engaging the corresponding faces of the lateral projection of the other member.

2. A packing ring comprising a pair of annular members each having a boss formed on its inner face whose inner surface is flat and parallel with the faces of the ring, and a diametrically opposite cleft with rabbeted portions at both sides thereof, said rabbeted portions forming bearing surfaces for the inner face of the boss and extending parallel with the faces of the ring and having end shoulders adapted to contact with said boss under full compression, said boss spanning the space between the ends of the adjacent ring.

In testimony whereof I affix my signature.

PAUL TAWNEY.